United States Patent

Gessner et al.

Patent Number: 5,891,156
Date of Patent: Apr. 6, 1999

[54] DEVICE FOR EQUIPPING BIRDS WITH A TRANSPONDER

[75] Inventors: Annette Gessner, Käshofen, Germany; Brian Eadie, Renfrewshire, Scotland

[73] Assignee: Diehl Ident GmbH, Nürnberg, Germany

[21] Appl. No.: 788,051

[22] Filed: Jan. 23, 1997

[30] Foreign Application Priority Data

Jan. 23, 1996 [DE] Germany .......................... 296 01 041.3
Oct. 25, 1996 [DE] Germany .......................... 196 44 328.8

[51] Int. Cl.⁶ ...................................................... A61B 17/00
[52] U.S. Cl. ............................ 606/117; 606/151; 24/327; 24/493
[58] Field of Search ................................... 606/117, 151; 24/3.7, 327, 335, 336, 493, 570, 571

[56] References Cited

U.S. PATENT DOCUMENTS

| | | | |
|---|---|---|---|
| 1,605,868 | 11/1926 | Suttin | 24/327 |
| 2,970,359 | 2/1961 | Dryden . | |
| 3,907,182 | 9/1975 | Bryant | 224/2 B |
| 3,955,580 | 5/1976 | Thompson | 128/330 |
| 4,325,526 | 4/1982 | Kitagawa | 248/73 |
| 4,659,000 | 4/1987 | Sales et al. | 224/252 |
| 4,669,156 | 6/1987 | Guido et al. | 24/336 |
| 4,866,213 | 9/1989 | Lindsay | 174/35 |
| 5,461,807 | 10/1995 | Johnson . | |

FOREIGN PATENT DOCUMENTS

| | | |
|---|---|---|
| 1006747A3 | 11/1994 | Belgium . |
| 485039A1 | 5/1992 | European Pat. Off. . |
| 252532A1 | 12/1987 | Germany . |
| WO 95/04455 | 2/1995 | WIPO . |

OTHER PUBLICATIONS

O. Behlert (1989) Die Markierung von Zoo–und Haustieren mit dem elektronischen Markierungsverfahren EURO I.D., Kleintierpraxis (34th edition) vol. 9 (1989): 477–479.

Primary Examiner—Michael Buiz
Assistant Examiner—Tina T. D. Pham
Attorney, Agent, or Firm—Scully, Scott, Murphy & Presser

[57] ABSTRACT

A device for equipping birds with transponders (21) is not in the form of a foot ring but a wing tag (11) ; with the particularity that one of the at least two stiff plastic limbs (12') which are connected together at respective ends by way of a bending yoke (13) is provided with a trough-shaped or pocket-shaped receiving means (22) for a tube transponder (21) . Preferably, in the case of a three-limbed construction, a cover limb (12") which is reversibly latchable to the transponder limb (12'), when the tag (11) is still open, is disposed in the longitudinal direction between the transponder limb (12') and a rearward holding limb (12) which in turn, at its free limb end (15), can be positively lockingly connected to the cover limb (12") by means of a barb-type pin (17), opposite the latching means, with a wing bone being engaged therebetween. That connection which is irreversible after fitting to the wing does not have to be broken open again to remove the transponder (21) because for that purpose the transponder limb (12') with its transponder receiving means (22) formed therein in the longitudinal direction then simply has to be pivoted away from the rest of the wing tag (11) and thus the wing of the poultry in order to be able to then re-use the comparatively expensive transponder (21) with a fresh tag (11), in relation to the next generation.

10 Claims, 2 Drawing Sheets

1

DEVICE FOR EQUIPPING BIRDS WITH A TRANSPONDER

BACKGROUND OF THE INVENTION

1. Field of the Invention

The invention concerns a device for equipping birds with a transponder.

2. Discussion of the Prior Art

For the purposes of equipping birds or fowl or poultry with electronic passive high-frequency transponders, it is known from the article 'Die Markierung von Zoo- und Haustieren mit dem elektronischen Markierungsverfahren EURO I.D.' by O Behlert in KLEINTIERPRAXIS, 34th edition, pages 477 to 479 (1989), for the thin, bar-shaped, glass-encased transponder to be implanted into the pectoral musculature, a thigh or one side of the neck in front of the shoulder of birds, where the foreign body grows into the bird in a positionally stable manner and cannot be readily removed again even after the animal has been slaughtered. Directly fitting a transponder in that way is therefore worth discussing only in relation to select animals, for example in a zoo for the purposes of documenting behaviour or breeding results and in the domestic animal sector for identifying the owners. An implanted transponder of that kind would subsequently cause problems in the situation involving large-scale animal husbandry for producing meat.

It is known in a pigeon sporting context to fit carrier pigeons with foot rings into which is fitted an identity transponder in order automatically to be able to detect the arrival time of the pigeon at the home loft without manual intervention requirements and to provide that information for competition assessment. Particularly in relation to chicks however it is scarcely possible permanently to fit foot rings and in particular to use the comparatively large transponder foot rings because in the first days of the life of the birds the feet are still so small and soft that the ring could be easily stripped off again; while on the other hand, in the first weeks of the life of the birds, the circumference of the legs of the birds increases quickly in such a way that a ring which fits closely over the foot would adversely affect the growth process. On the other hand, in regard to commercial animal husbandry, precisely also in relation to chicks which are only several days old, it is a matter of great interest, in terms of optimising the rearing result, of being able to observe and evaluate as early as possible for example changes in the feeding behaviour and the nesting habits of individual animals.

SUMMARY OF THE INVENTION

In consideration of those factors the technical object of the present invention is to improve the manner of the general kind set forth of fitting birds with electronic transponders, in such a way that even chicks in the first days of their life can already be reliably equipped therewith, without interfering with growth, and affording further use-oriented advantages of the employment of a transducer.

In accordance with the invention that object is substantially attained by a transponder wing tag as set forth specifically hereinbelow.

In accordance therewith the known metal strip bird tag which can be bent over around the wing bone of the bird, with identity information impressed therein or printed thereon, is replaced by an at least two-limbed U-, V-, Z- or W-shaped wing tag of electrically non-conducting material which accommodates the high-frequency transponder at one of its limbs and which can be fitted around the wing bone by means of a barb-type locking pin. The transponder which is encapsulated in a tube-like configuration can be held in force-locking or positively locking relationship in a trough-shaped depression or in a pocket in the form of a blind hole, which are also formed with the device in the plastic injection moulding procedure. The barb-type locking pin may be formed on a free end of the limb or it may be passed in latching relationship as a separate component through a hole therein. Disposed in opposite relationship to the pin, a yoke which is reduced in width in comparison with the thickness of the material of the limbs serves as a desired-bending location when the wing tag is being fitted and if necessary it serves as a desired-fracture location for removal of the wing tag. The transponder which is only clamped into the trough or pocket and which is expensive in comparison with the injection moulded wing tag and which is registered for a given breeder can then be removed again from its plastic mounting, for example at the conclusion of the feeding or fattening phase, and kept in readiness for fitting again to the following generation.

BRIEF DESCRIPTION OF THE DRAWINGS

Additional alternatives and developments as well as further features and advantages of the invention will be apparent from the following description of preferred embodiments of the present invention which are shown in diagrammatic view enlarged approximately to scale, being restricted to what is essential. In the drawing.

DETAILED DESCRIPTION OF THE PREFERRED EMBODIMENTS

Figure 1:
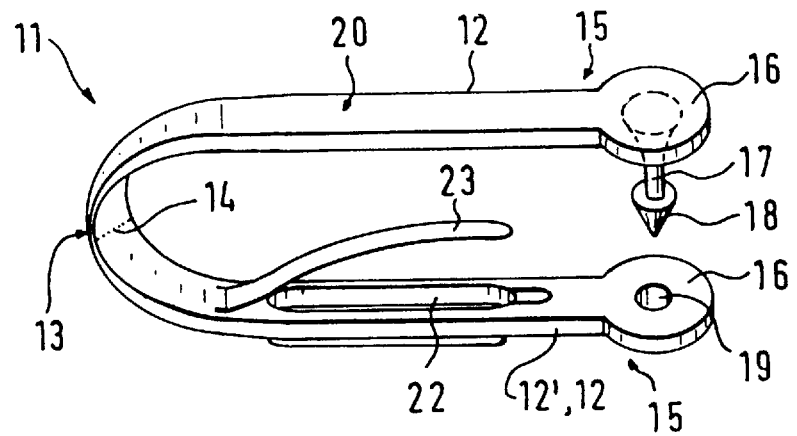
FIG. 1 shows a perspective view of a wing tag with integrated, outwardly closed transponder receiving means and with an integrated locking pin.

The substantially U-shaped or V-shaped wing tag 11 which is diagrammatically shown as a perspective view in FIG. 1 is injection-moulded in one piece from stiffly elastic plastic material. Its relatively flexurally stiff limbs 12 are flexurally elastically connected together in the region of the yoke 13, for which purpose the thickness of the limb cross-section is reduced here to form a bending or desired-fracture region 14. At the free limb ends 15, which are disposed in opposite relationship to each other, the limbs 12 terminate in plate portions 16 which are moulded thereon in a substantially circular shape. A locking pin 17 with a barb tip 18 is moulded on one plate portion 16, facing towards the other. The barb tip 18 can be pressed through a hole 19 in the oppositely disposed annular plate portion 16, but after that it cannot be pulled out of sane again without mechanical destruction thereof.

The one limb 12 which is shown at the top in the drawing and which in use is fitted in front of the wing at the visible side can be formed on the outside as an information carrier 20, that is to say for example it can have a surface finish for applying thereto by glueing or printing visually perceptible information (which can be represented for example in alphanumeric form or as a bar code; not shown in the drawing). The oppositely disposed limb 12' which is downward in the drawing and which in use is fitted between the wing and the body of the bird is in the form of a transponder carrier.

Preferably a transponder 21 (FIG. 2; not shown in FIG. 1) in the form of a small glass tube which is designed in itself for injection into the body of an animal is used, in which a memory chip is connected to a sub-miniature ferrite core coil tuned to resonance in relation to a defined interrogation high frequency. An interrogation field at that frequency induces into the transponder 21 the electrical energy for reading out the memory, with the result that the interrogation field is attenuated (modulated) at the rhythm of the stored identity information. Demodulation of that time-dependent attenuation produces in the reading device from which the high-frequency interrogation field is emitted a decodable representation of the binary-coded identity information of the transponder 21 which is just being detected by the interrogation field, to identify the animal, for example the chick, which is fitted with that transponder tag 11.

The glass tube of the transponder 21 can be glued directly on to the inner or outer surface of a limb 12' for carrying the transponder. The fitting procedure is simpler and in particular more reliable if the transponder limb 12' has formed therein a trough-shaped receiving means 22 which extends in its longitudinal direction and which can also be curved outwardly beyond the thickness of the material of the limb 12', as is shown in FIG. 1. The glass tube of the transponder 21 can then be easily fitted into the trough-shaped receiving means 22 and fixed therein in positively locking or force-locking relationship. The transponder glass tube can be fixed in force-locking relationship by means of an adhesive, or by welding over same for example by means of a casing sheet or tongue as a cover 23 which is fitted on to or formed on the inside of the transponder limb 12', covering over the trough-shaped receiving means 22. The handling procedure involved is particularly simple if a thin elongate casing portion of that kind is pivoted (that is to say injection moulded in the form of a flap) in the manner of an injection moulded skin alongside or in a tongue-like configuration transversely to the inside of the transponder limb 12' in the vicinity of the receiving means 22 and then after the transponder 21 has been fitted into place it only needs to be pivoted over sane and glued or welded at the free end, as shown in FIG. 1.

Particularly when for example after a change in generation, the intention is to re-use the transponder 21 for another wing tag 11, it may be more desirable for the transponder glass tube to be only fitted in force-locking relationship into the receiving means 22, for example by clamping it into the trough-shaped depression as shown in FIG. 1. A desirable configuration for that situation is a pocket-shaped receiving means 22 in the manner of a blind hole (FIG. 2) which is then arranged lengthwise on the transponder limb 12' on the outside thereof, preferably being moulded thereon, and which is desirably accessible by virtue of the fact that it is open at one end for the transponder tube 21 to be inserted into same. Opposite thereto, the receiving means 22 which is in itself in the form of a blind hole can also be provided with a small opening 24 in order to be able to insert here an ejection bar or mandrel member for pushing the transponder 21 out of its receiving means 22 which is open opposite sane.

Figure 2:
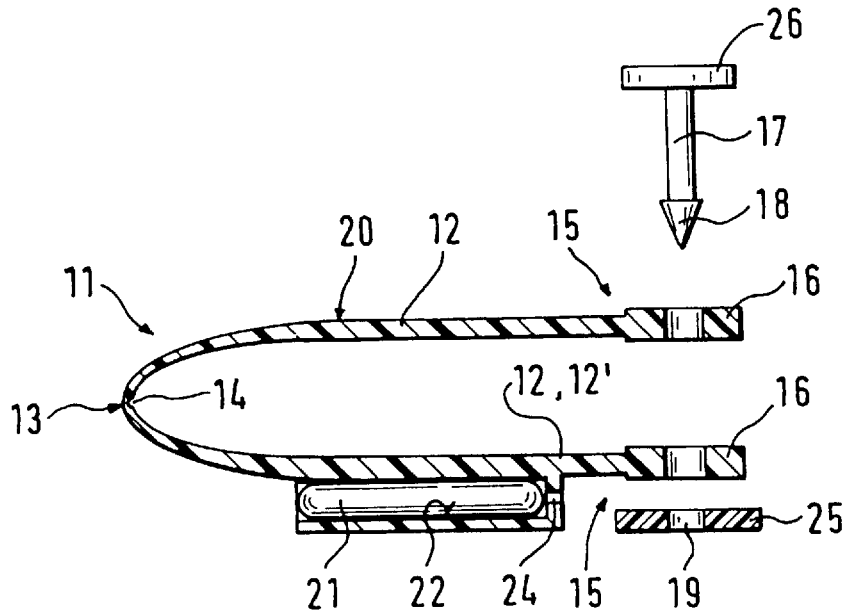
FIG. 2 is a view in longitudinal section of a wing tag with a transponder receiving means which is accessible from the exterior, and with a separate locking pin.

In the two-limbed configuration shown in FIG. 2 the locking pin 17 is not an integral component of the wing tag 11 but is formed separately. Its barb tip 18 can be pushed through apertured plate portions 16 at the ends 15 of the limbs and at the same time latched in position, or latched to an apertured disc 25 which is disposed therebehind in opposite relationship. At the insertion side, a peripherally extending collar 26 on the pin 17 limits the insertion thereof into the holes 19 which are aligned when the limbs 12–12' are in the condition of being fitted together.

To fit the wing tag 11 for example with a clamping tool, the limbs 12, 12' (with the receiving means 22 already equipped with transponders 21) are unfolded until they are approximately in their extended form in which they can be supplied item by item from a magazine without causing any problem. The limb end 15 at the transponder side is fitted to the bird by being pushed behind the wing bone through the spread-out wing, whereupon the two limbs 12, 12' are bent together about the yoke 13. As a result the plate portions 16 are disposed coaxially in front of the wing bone and they can be connected together in positively locking relationship by means of the locking pin 17 which is integrally formed on the wing tag or which is also supplied from the magazine, so that, when the wing tag 11 is fitted, the information carrier 20 is then visible in front of the wing.

In order to remove the wing tag 11 again, for example in order to be able to re-use the transponder 21 in another wing tag (in relation to another animal), the locking pin 17 is cut through and/or the reduced-thickness region 14 in the yoke 13, which is designed as a desired-fracture location, is broken apart or also cut through, so that at any event the two limbs 12, 12' which are now no longer fixedly connected together can be lifted off towards the two sides of the wing. The glass tube transponder is pushed in the transverse direction out of the trough-shaped receiving means 22 or pushed out of the receiving means 22 in the form of a blind hole in the longitudinal direction thereof, and can serve directly for fitting to another wing tag 11, while when a wing tag 11 is re-used, it would generally have to be first disinfected.

Figure 3:
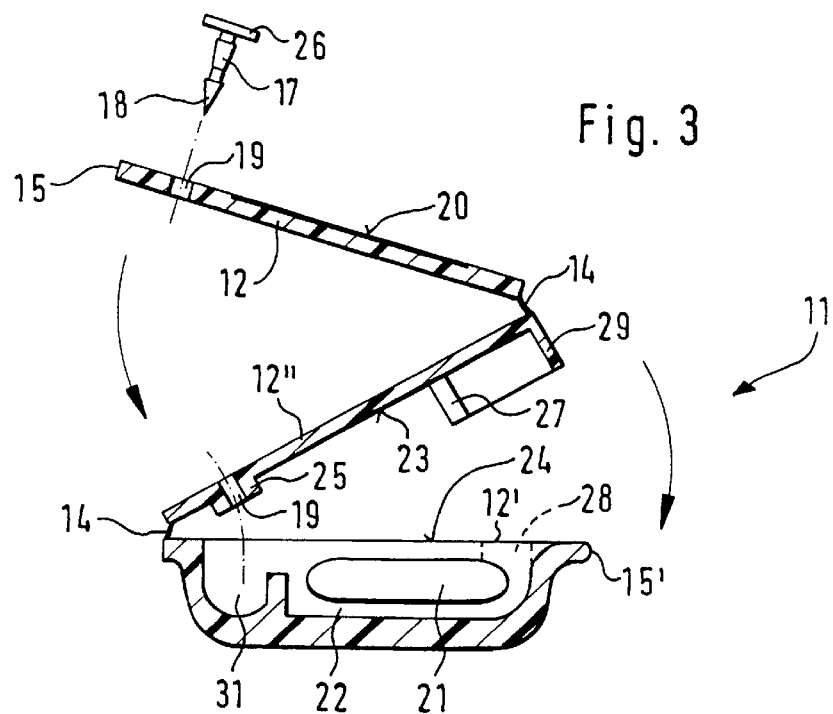
FIG. 3 is a view in longitudinal section of a Z-shaped three-limbed wing tag with a separate locking pin, as a development of the wing tag shown in FIG. 1.
Figure 4:
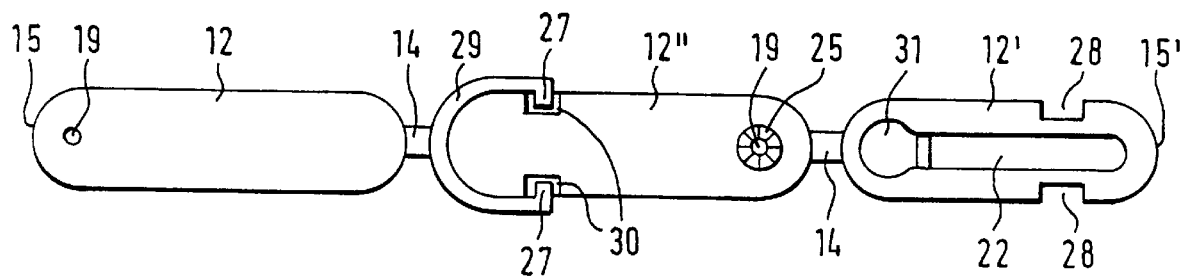
FIG. 4 shows the wing tag of FIG. 3 with the three limbs thereof in the stretched-out condition, viewing on to the trough-shaped transponder receiving means, but shown here without the locking pin and the transponder.

The embodiment of the wing tag 11 shown in FIG. 3/FIG. 4, which is modified in particular in comparison with FIG. 1, involves the linear succession of three limbs, when the tag 11 is still open, namely a cover limb 12" between an inner limb 12 and a transponder limb 12' which is later disposed outwardly. The latter are each contacted to respective ones of the two ends of the cover limb 12' by means of film hinges as the reduced-thickness bending regions 14, preferably being integrally injection moulded from light plastic material. The wing bone of the bird which is to be fitted with such a tag 11 as shown in FIG. 3 is engaged between the inner limb 12 and the cover limb 12' adjoining same and therefore does not come into contact with the transponder region. The retaining disc 25 which irreversibly receives the barb tip 18 of the locking pin 17 which is in the form of a narrow cone is arranged or moulded in the vicinity of the end of the cover limb 12', which is opposite to the hinge region 14. It will be seen from the view in FIG.4 that the hole 19 in the retaining disc 25 which irreversibly receives the barb tip 18 of the locking pin 17 in the form of a narrow cone is radially slotted in order to make it easier to introduce the barb tip 18 and then in addition to that positively locking engagement to exert a barb-action force-locking engagement on the shank of the locking pin 17.

The tube transponder 21 is again fitted into a trough-shaped recess in the transponder limb 12', parallel to the longitudinal extent thereof, wherein the receiving means 22 is now closed by means of the inner limb 12" which bridges over the two outer limbs 12/12'. For that purpose the transponder limb 12' and the cover limb 12" which adjoins one end thereof are folded over one on to the other in the longitudinal direction about the transitional region 14 which is reduced in thickness to form the film hinge, whereby the loading opening of the trough-shaped transponder. receiving means 22 is covered over mechanically more reliably than by a thin tongue (as shown in FIG. 1). The arrangement involves a force-locking, re-openable detent locking action by virtue of lateral claws 27 which are moulded laterally on the cover limb 12" opposite the retaining disc 25 and engage into lateral recesses 28, at corresponding locations, beside the trough-shaped receiving means 22 in the transponder limb 12'. That detent retaining action is stabilised by a collar 29 which extends in a horseshoe-shape between the two claws 27 along the adjacent end of the cover limb 12' and into which the free end 15' of the limb closely fits in positively locking relationship when those two limbs 12"–12' are folded together in order thereby to be supported in positively locking relationship in the longitudinal and transverse direction opposite its hinge region 14 and thus to stabilise the detent connection. In order further to improve the spring action in respect of the elastically deformable detent claws 27 in spite of the restricted dimensions in the direction of the thickness of the respective limb 12, openings 30 are provided in the cover limb 12" below the ends of the detent claws 27, which face towards the longitudinal central plane of the limb 12" and thus towards each other.

Opposite the free limb end 15', that is to say in the vicinity of the hinge-like transitional region 14 to the central limb or cover limb 12", an opening 31 is also formed in the transponder limb 12' at the end thereof in front of the trough-shaped transponder receiving means 22. When the transponder receiving means 22 is closed, the detent disc 25 formed under the cover limb 12" engages into the opening 31 and the opening 31 is thus also deep enough for engagement of the locking pin tip 18.

Thus, the development going from the V-shaped two-limbed wing tag 11 to the Z-shaped three-limbed wing tag 11 ensures a functional separation as between the region for fixing to the wing bone and the receiving region for the transponder 21. Its trough-shaped receiving means 22 lies in front of the wing of the animal fitted with the tag 11. The receiving means 22 can be opened again without releasing the tag 11 from the bird, after manually springing open the horseshoe-shaped detent closure at the collar claws 27, by simply pivoting the transponder limb 12' away from the central limb 12", so that the transponder 21 can be easily removed for re-use elsewhere, leaving behind the plastic portion (wing tag 11) on the animal for slaughter.

In other words, in the preferred three-limbed configuration, a cover limb 12" which can be reversibly latched to the transponder limb 12', when the tag 11 is still open, is disposed in the longitudinal direction between the transponder limb 12' and a rearward holding limb (12) which in turn, at its free limb end 15, can be positively lockingly connected to the cover limb 12" by means of a barb-type pin 17—opposite the latching engagement—with a wing bone being engaged therebetween. That connection which is irreversible after fitting to the wing does not have to be broken open again at a later time for removing the transponder 21 prior to the slaughter procedure because for that purpose then the transponder limb 12' with its transponder receiving means 22 formed therein in the longitudinal direction thereof can then simply be pivoted away from the rest of the wing tag 11 and thus the wing of the poultry bird, in order to be able to re-use the comparatively expensive transponder 21 with the next generation, in that case with a new plastic tag 11, while the actual three-limbed tag 11 remains behind on the fully grown animal.

We claim:

1. An animal identification tag with a rod-shaped transponder (21) including a device having a plurality of limbs for mounting said tag and transponder; said identification tag comprising a wing tag for birds; one of said plurality of limbs (12'), being equipped with a pocket or trough-shaped receiving means (22) for said transponder (21), said transponder (21) being removable from said receiving means without having to remove the wing tag from the wing of the bird; said wind tag comprising an at least three-limbed wing tag (11), the cover means (23) for the transponder receiving means (22) in the transponder limb (12') being a limb (12") which is pivotable relative to said other limbs (12, 12'). and said cover limb and one said other limb (12', 12") are reversibly latchable with each other; at least a part of one of the limbs (12') being encompassed by an arcuate collar (29) which terminates in latching claws (27) with which there are operatively associated openings (28) formed in an adjacent limb (12').

2. A device according to claim 1, wherein two stiff of said limbs (12—12) which extend adjacent to each other in the longitudinal direction are connected together by a film hinge forming a flexurally soft yoke (13).

3. A device according to claim 1, wherein transponder receiving means (22) is formed in a pocket shape on one of the limbs (12').

4. A device according to claim 1, wherein the transponder (21) is fixed in a trough-shaped receiving means (22) which is formed in one said limb (12') to extend in the longitudinal direction thereof.

5. A device according to claim 4, wherein cover means (23) is provided for closing the trough-shaped transponder receiving means (22).

6. A device according to claim 5, wherein the cover means (23) is formed in a tongue-like or flap-like shape on the transponder limb (12').

7. A device according to claim 1, wherein a barbed tip (18) is formed on the locking pin (17) which engages from a free limb end (15) through an apertured plate portion (16) at the limb end which is in diametrally opposite relationship with the connecting region (14) to the adjacent limb (12' or 12").

8. A device according to claim 1, wherein a locking pin (17) has a barbed tip (18) which engages through a slotted-apertured plate portion (16) and engages into an opening (31) which is formed in one said transponder limb (12') proximate an end of the trough-shaped transponder receiving means (22).

9. A device according to claim 1, wherein said collar comprises a horseshoe-shaped collar (29) which extends along an adjacent end of a cover limb (12') between two claws (27), a free end of a limb (15') upon folding together of two successive limbs (12') form-fittingly engaging into said collar so as to be form-fittingly supported opposite a hinge region (14) in longitudinal and transverse directions.

10. A device according to claim 1, wherein said arcuate collar (29) encompasses one end (15') of said limb (12'), and said openings (28) are formed proximate an end (15') of an adjacent limb (12').

* * * * *

UNITED STATES PATENT AND TRADEMARK OFFICE
CERTIFICATE OF CORRECTION

PATENT NO. : 5,891,156
DATED : April 6, 1999
INVENTOR(S) : A. Gessner, et al.

Page 1 of 1

It is certified that error appears in the above-identified patent and that said Letters Patent is hereby corrected as shown below:

<u>Column 6, claim 1</u>,
Line 15, "wind" should read -- wing --
Line 18, "(12,12'). and" should read -- (12,12'), and --

Signed and Sealed this

Thirtieth Day of October, 2001

*Attest:*

*Attesting Officer*

NICHOLAS P. GODICI
*Acting Director of the United States Patent and Trademark Office*